March 18, 1969  KAZUYOSHI YAMADA ET AL  3,433,197

METHOD OF CUTTING THE HULL OF A SHIP

Filed Dec. 19, 1966

INVENTORS
KAZUYOSHI YAMADA
HIROSHI WAKAZAKI
JYURO DOI
BY
ATTORNEYS

United States Patent Office 3,433,197
Patented Mar. 18, 1969

3,433,197
METHOD OF CUTTING THE HULL OF A SHIP
Kazuyoshi Yamada, Hiroshi Wakazaki, and Jyuro Doi, Yokohama-shi, Japan, assignors to Mitsubishi Jukogyo Kabushiki Kaisha, Tokyo, Japan
Filed Dec. 19, 1966, Ser. No. 602,711
Claims priority, application Japan, June 28, 1966, 41/41,963
U.S. Cl. 114—77                9 Claims
Int. Cl. B63b 3/02, 9/04

ABSTRACT OF THE DISCLOSURE

A plurality of control plates with strain measuring means are welded to the hull of a vessel across a cutting line. As the vessel is cut the strain is measured and the vessel reballasted to keep the strain as low as possible.

---

The present invention relates to a method of cutting the hull of a structure floating on the water, such as a ship.

In the prior art it is usual to rebuild a structure floating on the water, such as a ship, in a dock, where the hull of the ship is cut and parts thereof are joined. Recently constructed ships have rapidly increased in largeness because of great profit as well as thinks to the progress in the shipbuilding art. Thereby, it has also been required to rebuild the hull of a ship so as to make it much larger. Most parts of the existing dock installations, however, have not a capacity for the rebuilding of a super ship. Accordingly, in order to meet the increasing necessity to make the hull much larger, either the erection of a new dock installation or the enlarging of an existing one is needed. In any case, the cost of dock installation unfavorably becomes high.

Accordingly, an object of the present invention is to provide a novel method of safely dividing the hull of a ship in afloat condition, especially the method including cuttings of the hull below water line.

Another object of the present invention is to provide a method of cutting a structure in afloat condition for instance the hull of a ship, characterized in that a plurality of control plates are fastened to the shell plates of the hull which is to be divided, in afloat condition, into a proper number of parts, that strains in said plates due to stresses produced therein as the cutting of the hull proceeds are measured, that by ballasting the hull in order that said strains may be eliminated initial shearing forces and bending moment on the hull are reduced, and that said plates are, in finishing the cuttings, used as detachment pieces by which the divided parts, a fore and a aft hull part are separated in the almost balanced condition.

In accordance with the present invention, the increase in stresses on the hull is prevented and both divided parts thereof are adjusted to a substantially complete balancing. Furthermore, the cuttings and separating of the hull are safely performed in order that the hull as well as human bodies may be protected from any damages due to unexpected internal and external forces.

For an understanding of the principles of the invention, reference is made to the following description of a typical embodiment thereof as illustrated in the accompanying drawings, wherein.

Figure 1:
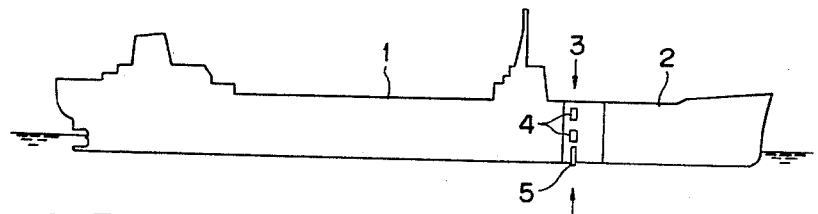
FIG. 1 is a side view of the hull of a ship to which the method of the invention is applied.

In the embodiment of the invention shown in FIG. 1, 1 designates the aft hull part of a ship after cutting. The fore hull part thereof is indicated by 2. The hull is cut at a cutting location 3, where control plates 4 are provided. An apparatus 5 for cutting the hull below water line is, for instance by using a waterproof band, tightly secured, below the water line, on the outside of the cutting portion of the shell plate of the hull and around the bottom of the ship and further on the other side thereof. Thereby, a necessary space for performing, gas cuttings of the hull from inside a tank below water line is given.

Figure 2:
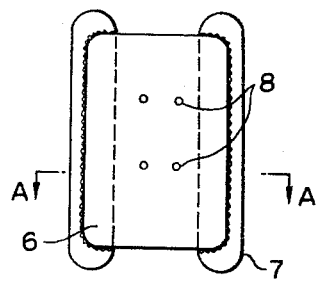
FIG. 2 is a plan view of a control plate usable in said method.

The control plate 4 is, in detail, shown in FIG. 2. The body 6 of the control plate is made of a steel plate 35 to 50 mm. thick and is firmly joined to two bars 7.

At these bars the control plate is, by welding, fixed to the shell plate of the hull and, therefore, a space 9 is produced between the body 6 and the shell plate of the hull. Usually, on one side of the ship, one control plate 4 is provided on the top stroke of hull while the other control plate 4 is provided just above the water line. Likewise, two control plates are provided on the other side. In other words two control plates on one side are symmetrical with those on the other side.

A gauge 8 is used for measuring strains caused, on the control plate 4, by changes of external fixing forces. The gauge may usually be a contact gauge or a resistance wire strain gauge.

Now, the steps of the method of the invention will be described. First, the hull of a ship to be cut is, in afloat condition, subjected to the adjustment of water ballasts which will come from calculations in order that a shearing force and a bending moment at the cutting location on the hull may be a minimum respectively. In this adjustment, it is inevitable that a contain amount of shearing force and of bending moment remain owing to the unknown factors in calculation. But initial stresses on the hull due to such shearing force and such bending moment have to negligibly small that an unhindered gas-cutting may be permitted.

After the ballast adjustment control plates 4 are fixed to the sides of the ship, as shown in FIG. 1 and the readings or gauge 8 and set at zero point. Upon the side thereof one control plate is positioned, while the other is positioned just above the water line. The control plate 4 is, for safety, designed so as to have enough sectional area and located to resist any supposed initial shearing force and bending moment.

Figure 5A:
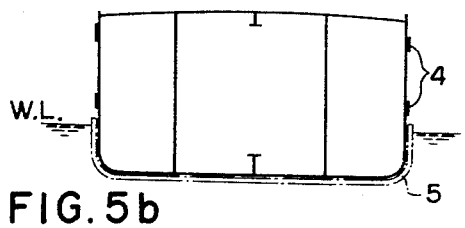
FIGS. 5a, 5b, 5c and 5d are schematic views showing the order of cutting of the hull.
Figure 5B:
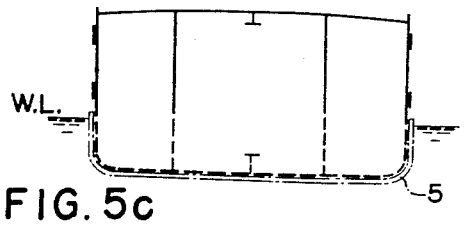

The apparatus for cutting the hull below water line is then tightly secured thereto, as shown in FIG. 5a. The hull below water line is cut, as shown by the dash line in FIG. 5b. Thus, the remained sectional area of the hull is reduced and therefore stresses due to the initial shearing force and initial bending moment are increased, causing a strain on the control plate 4. The strain is indicated by the gauge 8. In order to reduce a measured value of the strain to original zero, the second adjustment of water ballasts has to be made. As a result of this adjustment, the initial shearing force and the initial bending moment are reduced to a great extent.

Figure 5C:
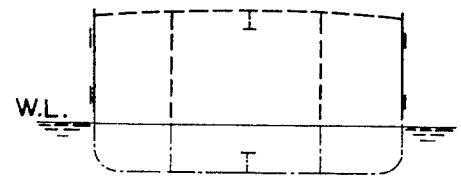

In this condition, the apparatus 5 for cutting the hull below water line is removed from the compartment which involves the cutting line is flooded, as shown in FIG. 5c, and the cuttings of the deck plate with attached internal members are performed after adjusting water ballasts to have the same stress condition as original. After these cuttings, on the control plate 4 a strain due to the remaining shearing force and such bending moment occurs, which is indicated by the gauge 8. A ballast adjustment is again made for bringing a measured value of strain to original zero.

Figure 5D:
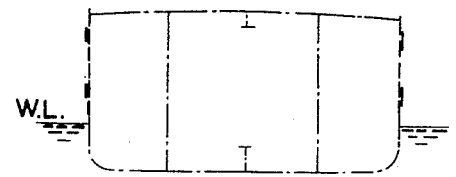
Figure 3:
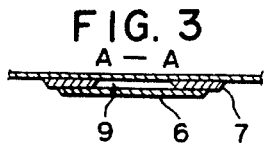
FIG. 3 is a sectional view taken along the line A—A of FIG. 2.

After this adjustment, the shell plates of the hull are cut, finally as shown in FIG. 5d. Four control plates 4, however, are still secured to the hull. The requisite cuttings of the hull are thus finished. Furthermore, in this condition, a ballast adjustment is again made so as to reduce a reading by the gauge 8 to original zero. Thereby, most parts of the shearing force and of the bending moment as supposed at the beginning of the cuttings vanish, while a small amount thereof remain owing to instrumental errors and other factors.

Figure 4A:
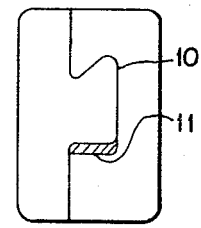
FIGS. 4a, 4b and 4c are schematic views showing in sequence, how the control plate is cut and is used as a hull detachment piece.

The gas cutting of the control plate 4 is next performed, said plate being cut in order that one part thereof may have hook-shaped protrusions 10 and that the other part may have corresponding recesses, as shown in FIG. 4a. Furthermore, the undersides 11 of the protrusions are cut off, so that gaps are formed. These gaps 11 serve, as limit gages, to control the complete balancing of the fore and aft hull part due to the ballast adjustments.

Figures 4B, 4C:
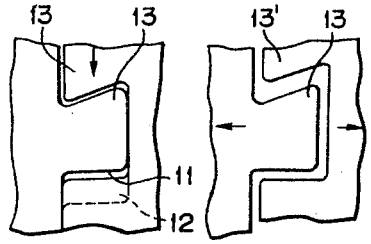

In the completely balanced condition, further, portions 12 under the gaps 11 are cut off, as shown in FIG. 4b. Thus, the hull parts are now separated.

In general, stress on the hull due to a certain shearing forces and bending moments occurring at cutting positions prior to cuttings of the hull increase due to reduction of sectional area of hull as the cuttings proceed. As a result, a danger of occurrence of cracks becomes greater and, further, damages to the hull due to the unbalancing of both hull parts at the end of cuttings of the hull are apt to take place. Difficulties just mentioned, however, have been overcome according to the method of the present invention, in which in order to prevent the increase in stresses on the hull to perform safe gas cuttings the initial shearing force and bending moment are gradually reduced, by adjusting the water ballasts and by using measuring gauges as cuttings proceed, in which, at the end of cuttings of the hull, the fore and the aft hull part are kept in the almost balanced condition and further, control plates having favorably fixed sectional area serve, as safety metal pieces, to protect the hull as well as human bodies from any damages due to unexpected internal and external forces, and in which, in separating both hull parts, gas cuttings are performed to obtain specially cut control plates designed for detachment pieces, said detachment pieces being used, as limit gages for control of the balancing of the hull, for safely separating both hull parts, the fore and the aft one in the completely balanced condition.

It is to be understood that various modifications of the disclosed embodiment may be made without departing from the spirit and scope of the present invention.

We claim:
1. A method of cutting the hull of a structure such as a ship which is floating on the water, comprising securing a plurality of control plates above the water line to the sides of the ship in alignment with the cutting line to be made through the ship hull, cutting a portion of the hull structure while the ship is in the afloat condition, measuring the strains due to the stresses taking place on the control plates after each cutting of the hull is carried out, ballasting the ship in a way so that the measured strains are substantially eliminated to thereby reduce any initial shearing forces and bending moments which are set up during the initial cutting, making additional cuttings of the hull until the hull structure both above and below the water line is separated into two parts and after each cutting step ballasting the hull to substantially reduce the measured strains on the control plates to zero, and completely separating the ship along the cut line by cutting the control plates.

2. A method according to claim 1, wherein said control plates are arranged to span the line of cutting and are welded at each side of the line of cutting to the hull structure so that the control plates hold the portions of the hull structure together after the hull of the structure has been completely cut through.

3. A method according to claim 2, wherein the hull is first cut below the water line by applying a below water line cutting apparatus around the portion of the ship hull below the water line to effect the cutting.

4. A method according to claim 3, wherein after the ship is cut below the water line it is cut through along the deck.

5. A method according to claim 4, wherein after the ship is cut below the water line and cut through above the deck the ship is again ballasted to reduce the strain indicated on the control plates to zero and the ship is then cut through on the sides of the hull above the water line.

6. A method according to claim 5, including cutting through the control plate in a manner to form an angled offset projection portion of one part which extends into a similar offset recess portion cut away on the other part, thereafter cutting away a portion of the plate having the recess which permits shifting of one plate in respect to the other and separation of the plates and the parts of the ship hull.

7. A method according to claim 6, wherein the ship is ballasted to reduce the strain after the control plate is first cut into two parts.

8. A method according to claim 1, wherein the ship is ballasted before cutting to reduce the strain along the cutting line to substantially zero, and wherein two control plates are secured to each side of the vessel in a manner to span the cutting line and are welded at each side to the hull structure, and wherein the ship is again ballasted in order to reduce the shear and bending forces along the cutting line as measured on the control plates to zero.

9. A method according to claim 8, wherein after the control plates are fixed to each side of the ship and the ship is ballasted to reduce the strain to substantially zero an underwater cutting gear is extended around the ship over the cutting line and cutting is carried out to sever the ship below the water line, and the ballast of the ship is again adjusted to minimize the strain indication, the vessel is then cut above the water line along the deck plates and internal members and the ballast is again adjusted to provide a strain indication on the control plates of substantially zero, and thereafter the sides of the ship are cut and the ballast again reduced to zero.

References Cited

UNITED STATES PATENTS 3,370,565   2/1968   Takezawa et al. _____ 114—77

TRYGVE M. BLIX, *Primary Examiner.*

U.S. Cl. X.R.

114—121